United States Patent [19]
Hancock

[11] Patent Number: 5,810,074
[45] Date of Patent: Sep. 22, 1998

[54] SERIAL HEAT EXCHANGER AND CASCADE CIRCUITRY

[75] Inventor: Stephen S. Hancock, Flint, Tex.

[73] Assignee: American Standard Inc., Piscataway, N.J.

[21] Appl. No.: 710,235

[22] Filed: Sep. 13, 1996

[51] Int. Cl.[6] .................................................... F28B 9/10
[52] U.S. Cl. .......................... 165/112; 165/111; 165/114; 165/917; 55/218; 46/204; 210/180; 210/181; 210/188
[58] Field of Search .................................. 165/111, 112, 165/114, 104, 27, 910, 911, 903, 917, DIG. 183, 144; 95/260; 55/218; 96/218, 204; 261/150; 62/515; 210/180, 181, 188; 137/197, 171, 173, 175

[56] References Cited

U.S. PATENT DOCUMENTS

| | | | |
|---|---|---|---|
| 153,139 | 7/1874 | Wilmot | 165/144 |
| 1,079,609 | 11/1913 | Shipley | 165/11 |
| 1,257,209 | 2/1918 | Fletcher | 165/917 X |
| 1,424,254 | 8/1922 | Mellor | 165/DIG. 183 X |
| 1,459,594 | 6/1923 | McWhorter et al. | |
| 3,345,803 | 10/1967 | Smith | 96/204 X |
| 3,660,987 | 5/1972 | Gail et al. | 137/197 X |
| 4,089,368 | 5/1978 | Bell, Jr. et al. | 165/139 |
| 4,470,450 | 9/1984 | Bizzell et al. | 165/911 X |
| 4,500,329 | 2/1985 | Campoli et al. | 55/218 X |
| 4,520,867 | 6/1985 | Sacca et al. | 165/144 |
| 4,707,166 | 11/1987 | Khosropour | 55/218 X |
| 4,760,742 | 8/1988 | Hatton | 96/204 X |
| 4,781,247 | 11/1988 | Schulz | 165/917 X |
| 4,831,844 | 5/1989 | Kadle | 62/507 |
| 5,036,909 | 8/1991 | Whitehead et al. | 165/911 X |

FOREIGN PATENT DOCUMENTS

| | | | |
|---|---|---|---|
| 2389859 | 1/1979 | France | 165/917 |
| 8600051 | 12/1987 | U.S.S.R. | 96/204 |

Primary Examiner—Ira S. Lazarus
Assistant Examiner—Christopher Atkinson
Attorney, Agent, or Firm—William J. Beres; William O'Driscoll; Peter D. Ferguson

[57] ABSTRACT

A serial heat exchanger. The heat exchanger comprises a serial passage extending from an inlet to an outlet and a plurality of vapor liquid separators extracting vapor from the passage.

13 Claims, 3 Drawing Sheets

FIG. 5
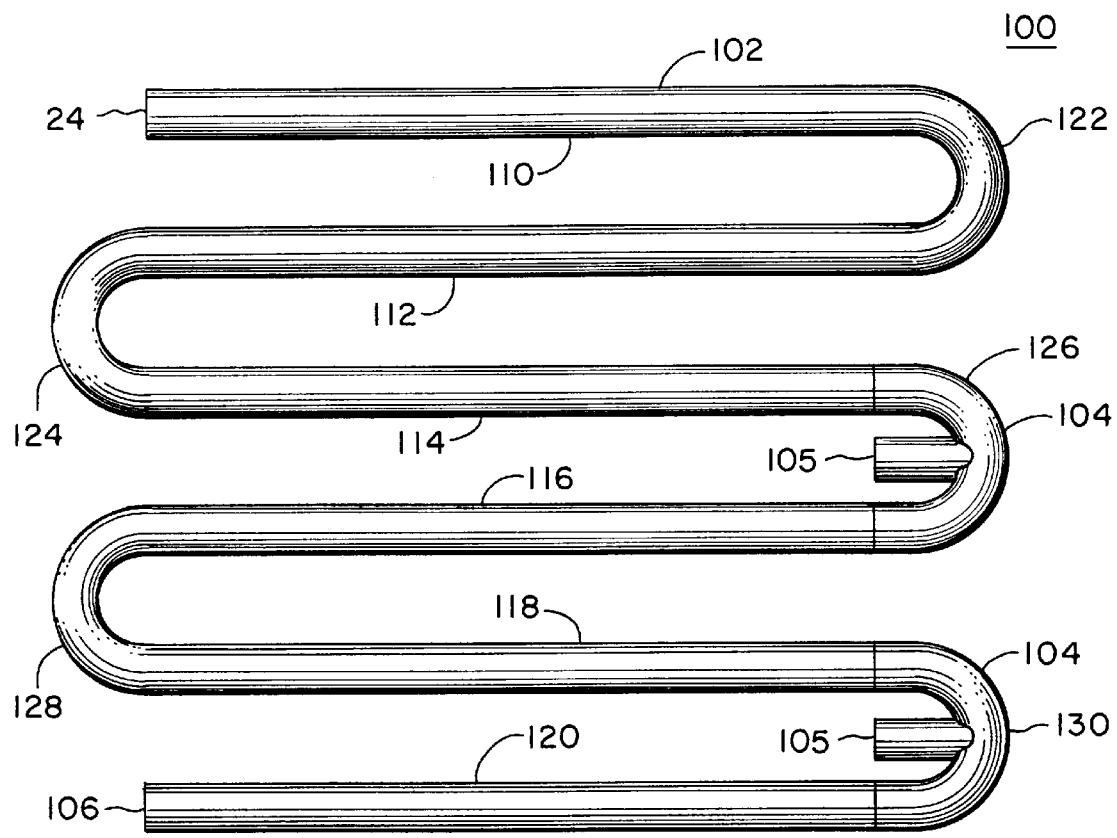
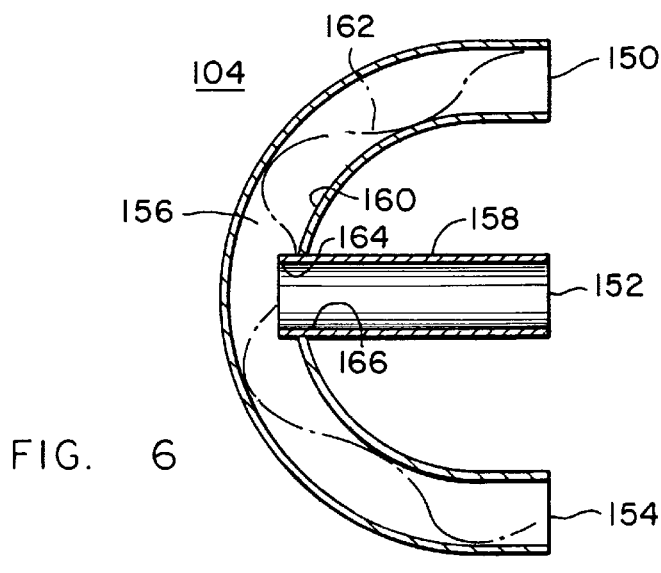
FIG. 6
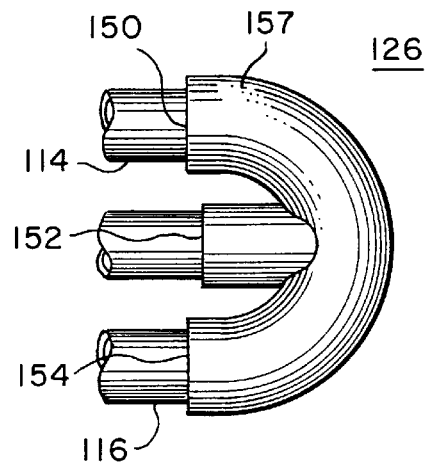
FIG. 7

SERIAL HEAT EXCHANGER AND CASCADE CIRCUITRY

BACKGROUND OF THE INVENTION

The present invention is directed to all heat exchangers where the refrigerant is enclosed in tubes, passages or the like particularly including fin tubes, fin coils and spine fin heat exchangers. Although directed to all heat exchangers, the present invention is particularly applicable to heat exchangers, such as evaporators, where vapor removal is an issue.

Present heat exchangers consist of either one long continuous tube, or a multi-circuited heat exchanger.

In the case of the long continuous tube, the two phase (primarily liquid) refrigerant at the start of the tube decreases in density as that two phase refrigerant travels the length of the tube. Depending on flow conditions, the refrigerant may be entirely vapor by the tubes' end, and the density very low. For larger heat exchangers, the pressure drop through this tube begins to have a severe effect on efficiency. This is especially true for evaporators.

In the case of the multi-circuited refrigerant heat exchangers, multiple circuits are introduced to address the pressure drop issues of long continuous tube heat exchangers. While multiple circuits solve this problem, they introduce other problems such as a heat transfer penalty. To achieve manageable vapor velocities (i.e., pressure drop) at the end of each circuit, multiple circuits have sub-optimal velocities through the bulk of the two phase region. Ideally, higher liquid velocities are preferred since these correspond to higher heat transfer coefficients. Complex distributors such as manifolds are employed to evenly divide the refrigerant among a plurality of refrigerant circuits. However, the quality of the refrigerant varies from circuit to circuit since the load on the system, and the velocity of the refrigerant flow, severely effects how the distributor distributes the refrigerant. For example, a distributor which works well under a high speed flow may result in an overabundance of refrigerant being directed to a particular circuit under low load or low flow conditions, and vice versa.

Additionally, the distributor itself is a costly piece of equipment which is time consuming to install properly and to design properly.

What is needed is a heat exchanger which maintains two phase flow throughout its length but without the multi-circuited distributors of the prior art.

SUMMARY OF THE INVENTION

It is an object, feature and advantage of the present invention to solve the problems of prior art heat exchangers.

It is an object, feature and advantage of the present invention to provide a serial heat exchanger which maintains a more consistent vapor to liquid refrigerant relationship throughout the length of the heat exchanger.

It is an object, feature and advantage of the present invention to eliminate the distributor required by multi-circuited heat exchangers.

It is an object, feature and advantage of the present invention to maintain a more constant refrigerating effect throughout the length of a heat exchanger than in a conventional coil.

It is an object, feature and advantage of the present invention to eliminate the worries about the quality of refrigerant distribution.

It is an object, feature and advantage of the present invention to provide a heat exchanger with multiple liquid/vapor separators.

Another advantage of the invention is that it provides more constant and higher average refrigerant velocities through the heat exchanger resulting in higher heat transfer with manageable pressure drop.

The present invention provides a serial heat exchanger. The serial heat exchanger comprises a serial passage extending from an inlet to an outlet and a plurality of vapor liquid separators extracting vapor from the passage.

The present invention also provides a method of exchanging heat between first and second fluids where the first fluid has a vaporous state and a liquid state. The method comprises the steps of: directing the first fluid into an enclosed passage; exchanging heat between the second fluid and the liquid state of the first fluid in the enclosed passage; and extracting the vaporous state of the first fluid from the passage as the vaporous state forms. The method may be improved by expanding the first fluid prior to the extraction step.

The present invention further provides a vapor liquid separator. The vapor liquid separator includes a curved passage connecting an inlet to an outlet where the inlet is vertically above the outlet and an intermediate vaporous outlet located on an inner side of the passage intermediate in height between the inlet and the outlet.

The present invention yet further provides a method of retrofitting a tubular heat exchanger having a plurality of U-bends. The method includes the steps of: removing selected U-bends; and replacing the selected U-bends with E-shaped vapor liquid separators.

BRIEF DESCRIPTION OF THE DRAWING

FIG. 4a shows the heat exchanger of FIG. 1, FIG. 4b shows the heat exchanger of FIG. 3 with an additional circuit, and FIG. 4c shows the heat exchanger of the present invention.

FIG. 5 shows the heat exchanger of the present invention including the novel vapor liquid separators.

FIG. 6 shows a vapor liquid separator of FIG. 5.

FIG. 7 shows a preferred embodiment of the vapor liquid separator of FIG. 6.

DETAILED DESCRIPTION OF THE DRAWING

Figure 1:
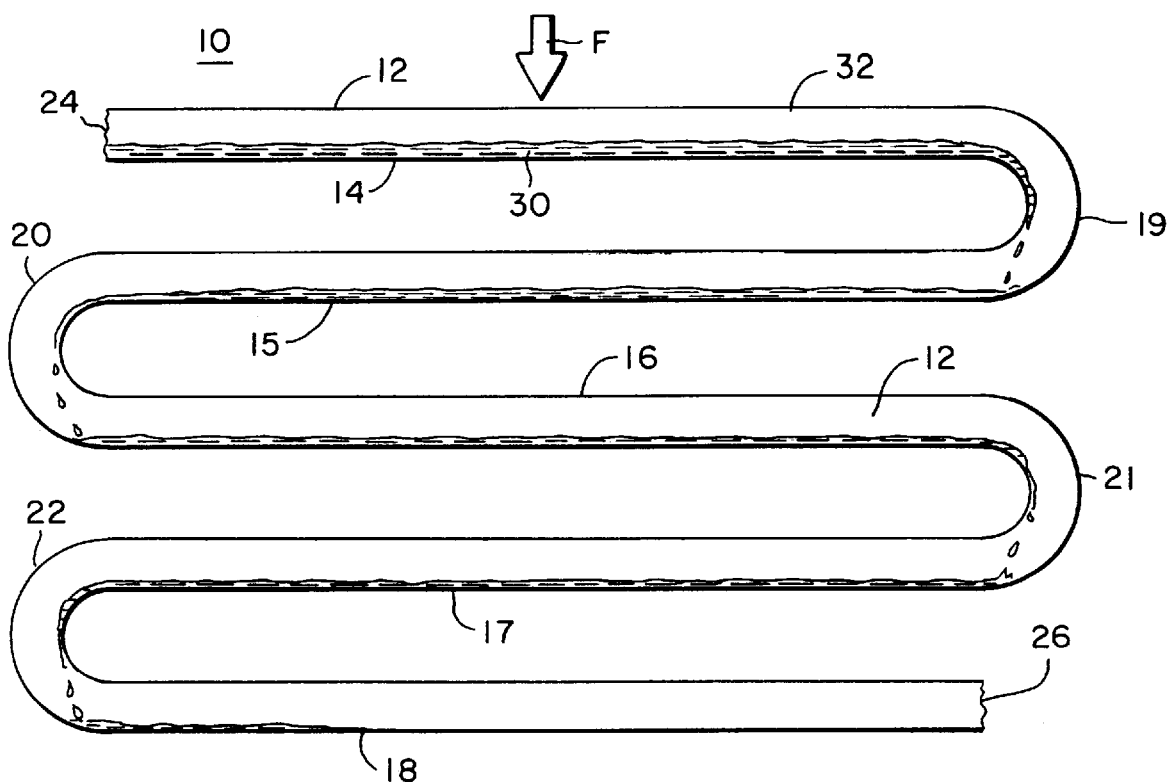
FIG. 1 shows a prior art heat exchanger of the long continuous tube type.

FIG. 1 shows a prior art heat exchanger 10 including an enclosed passage 12 for refrigerant. The heat exchanger 10 of FIG. 1 is a single circuited heat exchanger having five passes 14, 15, 16, 17 and 18 and four U-bends 19, 20, 21 and 22 respectively connecting the five passes. The heat exchanger 10 also includes an inlet 24 and an outlet 26. Two phase refrigerant, primarily liquid refrigerant, enters the inlet 24 and travels along the length of the passage 12. The two phase refrigerant exchanges heat through the wall of the passage 12 with a fluid "(indicated, for example, by arrow F)" outside the passage 12, vaporizing refrigerant in the process of doing so. The two phase refrigerant is indicated by the shading 30 and the vaporous refrigerant is indicated by the lack of shading 32 within the passage 12. As the length of the passage is traversed from the inlet 24 to the outlet 26, the percentage of liquid refrigerant decreases to the point where no liquid refrigerant is present at the outlet 26 and only vaporous refrigerant remains in the passage 12.

Figure 2:
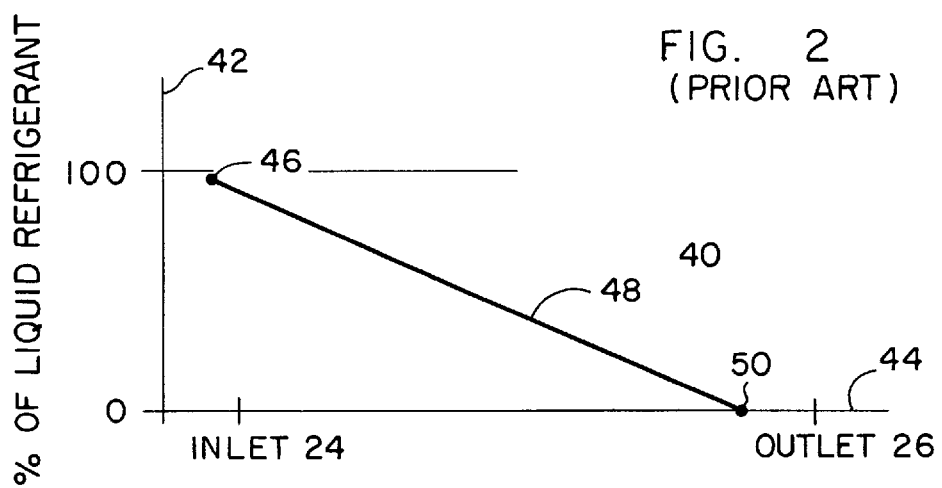
FIG. 2 is a graph of liquid refrigerant in the tube of FIG. 1.

This is further illustrated in FIG. 2 which includes a graph 40 of the percentage of liquid refrigerant to total refrigerant on the Y axis 42 as compared to the distance from the inlet 24 to the outlet 26 on the X axis 44. At the inlet 24 the percentage of liquid refrigerant is near 100% as indicated by point 46. The reduction at point 46 from 100% is usually attributable to flashing. As the length of the passage 12 is traversed, more and more liquid refrigerant absorbs heat and vaporizes, this being indicated by the line 48. At some point, before the outlet 26 is reached, there is no liquid refrigerant within the passage 12 as indicated at point 50 on the graph 40 and the vaporous refrigerant remaining is being superheated.

Figure 3:
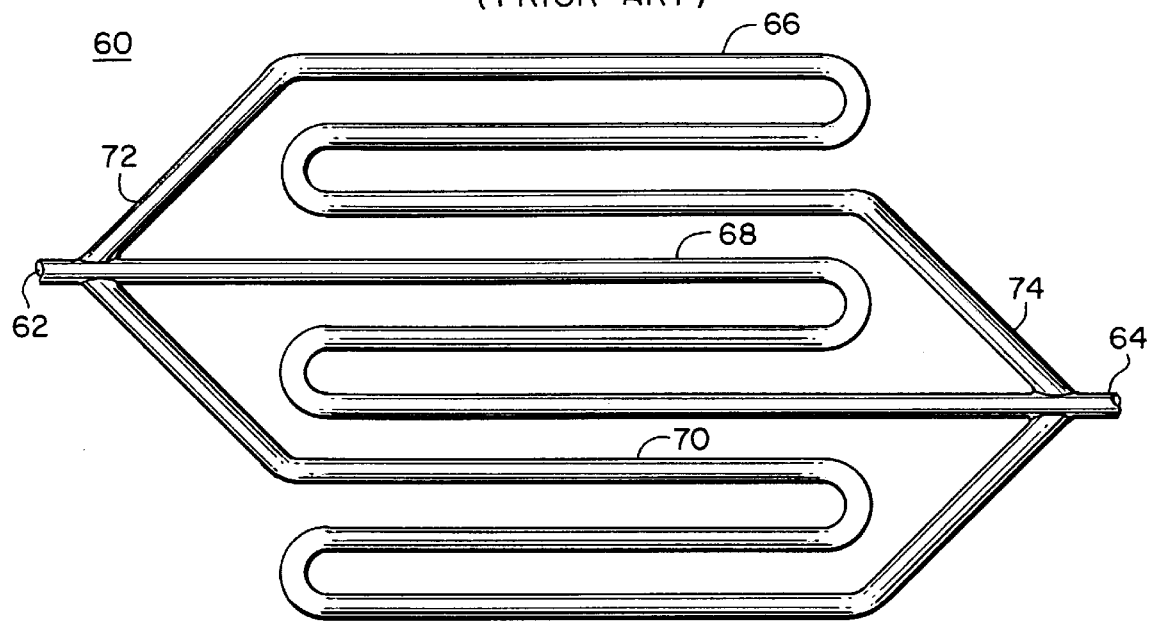
FIG. 3 shows a prior art, multi-circuited heat exchanger.

FIG. 3 illustrates a multi-circuited prior art heat exchanger 60. The three circuits shown here are merely exemplary and, as shown in FIG. 4b, more or less circuits can be used in any particular application. The heat exchanger 60 includes an inlet 62, an outlet 64, three circuits 66, 68 and 70, a distributor 72 between the inlet 62 and the circuits 66, 68, 70, and an outlet manifold 74 between the circuits 66, 68, 70, and the outlet 64.

The distributor 72 receives the flow from the inlet 62 and divides the flow in an attempt to give each of the circuits 66, 68, 70 the same quality of refrigerant. Depending on load and flow conditions, that quality of refrigerant in each circuit 66, 68, 70 may or may not be approximately the same. The distributor 72 itself is costly in terms of design, manufacture and installation in view of the need to maintain this consistent quality of refrigerant distribution under all conditions.

The discharge manifold 74 receives the refrigerant exiting each circuit 66, 68, 70, combines those refrigerants and directs them to the outlet 64. The outlet manifold 74 is relatively inexpensive in terms of comparison with the distributor 72, since the manifold 74 has no requirement to distribute refrigerant evenly under all conditions.

Figure 4A:
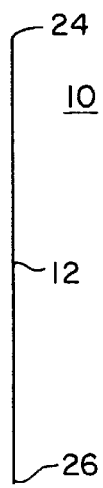
FIG. 4A–C are block diagrams comparing the prior art heat exchangers with the heat exchanger of the present invention.
Figure 4B:
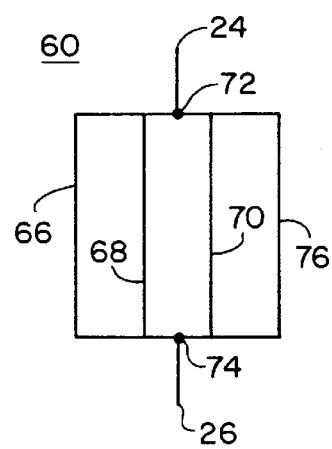
Figure 4C:
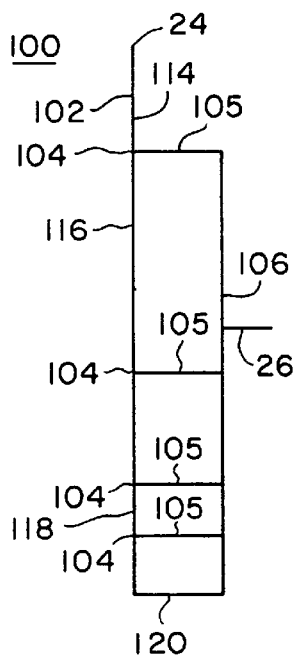

FIG. 4A and B show a comparison of the prior art heat exchangers 10 and 60 with the heat exchanger 100 of the present invention "as shown FIG. 4C". FIG. 4A shows the heat exchanger 10 as a single long passage 12 having an inlet 24 and an outlet 26. FIG. 4B shows the heat exchanger 60 including an inlet 24, an outlet 26 and four circuits 66, 68, 70 and 76 supplied by a distributor 72 and collected by a manifold 74. FIG. 4C shows the heat exchanger 100 of the present invention including an inlet 24 and outlet 26 and a serial heat exchange passage 102.

Periodically along the serial passage 102 are liquid vapor separators 104 which remove vaporous refrigerant and direct the vaporous refrigerant by means of tubing 105 to an outlet manifold 106 and then to the outlet 26. The passage 102 maintains a relatively constant two-phase relationship throughout the length of the tube while eliminating the distributor of the multi-circuited heat exchangers. Thus the present invention combines the advantages of the prior art heat exchangers but avoids their disadvantages.

FIG. 5 illustrates the heat exchanger 100 of the present invention in more detail. As shown, the heat exchanger 100 includes six passes 110, 112, 114, 116, 118 and 120 but this is clearly exemplary and variable for any particular application. Between each set of adjacent passes there is a U-bend including a U-bend 122 between passes 110 and 112, a U-bend 124 between passes 112 and 114, a U-bend 126 between the passes 114 and 116, a U-bend 128 between the passes 116 and 118, and a U-bend 130 between the passes 118 and 120.

In the present invention, selected conventional U-bends are replaced by the novel liquid vapor separators 104 of the present invention. In FIG. 5, U-bends 126 and 130 have been so modified. Note that the ease with which these U-bends can be modified demonstrates the ease at which the present invention can be applied to retrofit existing heat exchangers.

In practice, the farther along the length of the serial passage 102, the greater the number of separators 104 and the closer their spacing. This is because the percentage of liquid refrigerant is greater at the heat exchanger inlet 24 and because liquid refrigerant absorbs some amount of heat before vaporizing. This is best shown in FIG. 4C where the separators 104 are spaced increasingly closer together in direct proportion to their distance to the heat exchanger outlet 26 and in indirect proportion to their distance from the heat exchanger inlet 24. FIG. 5 also exemplifies this in that a first portion including the passes 110, 112 and 114 has no separators while a second portion, of similar length to the first portion and including the passes 116, 118 and 120, has separators 104.

A liquid vapor separator 104 is shown in more detail in FIG. 6. Each vapor liquid separator 104 can be considered to have an E-shape as shown in FIG. 6. The vapor liquid separator 104 includes an inlet 150 at the distal end of the E-shape's top arm, a vapor outlet 152 at the distal end of the E-shape's middle arm, and a two-phase outlet 154 at the distal end of the E-shape's bottom arm. A U-shaped passage 156 connects the inlet 150 with the two-phase outlet 154, while the vapor outlet 152 lies on an extension 158 from the centrifugally inner side 160 of the passage 156. The separator 104 is orientated as shown in FIG. 6 with the inlet 150 positioned above both outlets 152, 154, and with the two-phase outlet 154 at the lowest position. The separator 104 is preferably planar, but can be modified so that the various arms are non-planar.

In operation, vaporous and liquid refrigerant enter the inlet 150 and are pulled downwardly by gravity and outwardly by momentum and centrifugal force. The denser liquid refrigerant is thrown the furthest outwardly, displacing the vaporous refrigerant inwardly where at least some of the vaporous refrigerant exits through the vapor outlet 152. The liquid refrigerant and some of the vaporous refrigerant exit through the two-phase outlet 154. Thus the separator 104 removes vaporous refrigerant as it boils, thereby maintaining the two-phase refrigerant. As vapor is removed, more refrigerant boils to replace it thereby reducing the pressure somewhat and increasing the refrigerating effect. The percentage of refrigerant vapor will still vary from about 10% to 100% through the heat exchanger 100 as it does with a conventional multi-circuit coil. The difference with the serial heat exchanger 100 is that the average percentage remains lower (more liquid). Since the bulk of the heat capacity is associated with the liquid and the bulk of the pressure drop is associated with the vapor, more liquid is a good thing.

If the tubing, such as pass 114. leading to the separator inlet 150 includes helical ribs, grooves or the like, the two phase refrigerant may have a spin similar to that caused by rifling a barrel of a gun. In that case, the spin may cause the two phase refrigerant to "rifle" around the passage 156 as shown by the line 162. This spinning refrigerant could spin over the entrance 166 to the vapor outlet 152, allowing liquid or two phase refrigerant to exit. To prevent liquid or two phase refrigerant from entering the extension 158, a dam-like barrier 164 may be formed around the entrance 166 to the extension 158. The barrier 164 may be formed by welding a copper tube to form the extension 158 such that a portion of the tube projects into the passage 156 to form the barrier 164. Alternatively, material may be brazed or otherwise affixed to the passage 156 to form the barrier 164.

FIG. 7 shows a preferred embodiment of the vapor liquid separator 104 of FIG. 6 including similar reference numerals. The vapor liquid separator 104 at U-bend 126 is used so as to best illustrate the relationship with the passes 114 and 116. In testing the separators 104, it was found that the tendency of the two-phase flow to maintain its annular flow pattern was sometimes too strong for centrifugal forces to overcome. To breakup the annular flow pattern, the diameter of the U-shaped passage 157 was made larger than the diameter of the passes 114, 116 to which the inlet 150 and outlet 154 connect. The primary significance is at the inlet 150 where a rapid expansion of the vapor in the two-phase entering refrigerant breaks up the annular flow patterns and allows centrifugal force to pull the bulk of the liquid to the outside of the bend. Alternatively, some form of a turbulator could be used.

Although the present invention is particularly applicable to evaporators because vapor removal is an issue in evaporators, the present invention also applies to condensers where vapor is turning into a liquid. When the vapor liquid separator 104 is applied to condensers, the two phase flow is reversed, entering the outlet 154 and exiting the inlet 150. Furthermore, vapor is injected into the outlet 152 forming the center leg of the E-shape. Essentially the arrangement of FIG. 4c is reversed so that the connection 26 functions as an inlet and the connection 24 functions as an outlet. Vapor is continually added to replace the vapor condensing into liquid refrigerant so that condensation remains fairly constant throughout the length of the heat exchanger 100.

What has been described is a unique and novel serial heat exchanger including a plurality of liquid vapor separators. In the heat exchanger the quality of the two-phase flow is maintained while the difficulties of the distributors used in multi-circuited heat exchangers are avoided. A person of ordinary skill in the art would be expected to modify the present invention in a variety of ways. For example, the separator 100 works best when assisted by gravity with the outlet 154 on the bottom but good separation still occurs when working against gravity. If an "anti-gravity" application arises, the E-shape might be improved by going to more of a "jew's-harp" configuration with the inlet 150 at the bottom, and the two-phase outlet 154 at the top. Additionally, the serial passage preferably has a circular cross section but could be modified to elliptical, square or other cross sections. The shape of the separator can clearly be modified by rearranging the location of the arms of the E-shape and also by making the arms of different lengths or lying in different planes. Such changes could result in a corkscrew type separator with vapor being drawn off in the middle. Other modifications are also contemplated. All such modifications are intended to fall within the claimed invention.

What is desired to be secured as Letters Patent of the United States is as follows:

1. A heat exchanger comprising a serial passage extending from a heat exchanger inlet to a heat exchanger outlet and a plurality of vapor liquid separators located in the serial passage and extracting vapor from the passage wherein the vapor liquid separators are E-shaped.

2. A heat exchanger comprising a serial passage extending from a heat exchanger inlet to a heat exchanger outlet and a plurality of vapor liquid separators located in the serial passage and extracting vapor from the passage wherein the vapor liquid separators have a two phase inlet, a vapor outlet, and a two-phase outlet, and wherein the two phase inlet is above the vapor outlet and the two-phase outlet is below the vapor outlet.

3. The heat exchanger according to claim 2 wherein the passage has a first portion without separators and a second portion including the separators and wherein the portions are approximately equal in length.

4. The heat exchanger of claim 2 wherein the separators are spaced increasingly closer together in direct proportion to their distance to the heat exchanger outlet.

5. The heat exchanger of claim 2 where the vapor inlet includes a barrier around that inlet.

6. The heat exchanger of claim 2 including a vapor expander at the two phase inlet.

7. The heat exchanger of claim 6 wherein the separators are shaped and positioned to maintain a consistent refrigerating effect throughout the heat exchanger.

8. The heat exchanger of claim 2 including a vapor expander at the two phase inlet.

9. A heat exchanger comprising a serial passage extending from a heat exchanger inlet to a heat exchanger outlet and a plurality of vapor liquid separators located in the serial passage and extracting vapor from the passage wherein the separators are spaced increasingly closer together in proportion to their distance from the heat exchanger outlet.

10. The heat exchanger of claim 9 wherein the vapor liquid separators are E-shaped.

11. A vapor liquid separator comprising a curved passage connecting an inlet to an outlet wherein the inlet is vertically above the outlet and including an intermediate vaporous outlet located on an inner side of the passage intermediate in height between the inlet and the outlet and wherein the inlet has a diameter less than the diameter of the curved passage.

12. The vapor liquid separator of claim 11 further including a barrier in the curved passage around the intermediate vaporous outlet.

13. A vapor liquid separator comprising a curved passage connecting an inlet to an outlet wherein the inlet is vertically above the outlet and including an intermediate vaporous outlet located on an inner side of the passage intermediate in height between the inlet and the outlet and wherein the inlet has a diameter less than the diameter of the curved passage and further including a barrier in the curved passage around the intermediate vaporous outlet.

* * * * *

UNITED STATES PATENT AND TRADEMARK OFFICE
CERTIFICATE OF CORRECTION

PATENT NO. : 5,810,074
DATED : September 22, 1998
INVENTOR(S) : Stephen S. Hancock It is certified that error appears in the above-identified patent and that said Letters Patent is hereby corrected as shown below:

Column 3, Line 39, "FIG." should read -- FIGS. --.

In The Claims:

Claim 6, Column 6, Line 25, "claim 2" should read -- claim 5 --.

Signed and Sealed this

Eighth Day of December, 1998

Attest:

BRUCE LEHMAN

*Attesting Officer*     *Commissioner of Patents and Trademarks*